United States Patent
Kinoshita et al.

(10) Patent No.: US 12,459,453 B2
(45) Date of Patent: Nov. 4, 2025

(54) POWER SYSTEM (71) Applicants: SUBARU CORPORATION, Tokyo (JP); TOYOTA JIDOSHA KABUSHIKI KAISHA, Aichi-ken (JP); NISSAN MOTOR CO., LTD., Kanagawa (JP); HONDA MOTOR CO., LTD., Tokyo (JP); MITSUBISHI JIDOSHA KOGYO KABUSHIKI KAISHA, Tokyo (JP)

(72) Inventors: Takahiro Kinoshita, Tokyo (JP); Ryo Shirasawa, Tokyo (JP)

(73) Assignees: SUBARU CORPORATION, Tokyo (JP); TOYOTA JIDOSHA KABUSHIKI KAISHA, Aichi-ken (JP); NISSAN MOTOR CO., LTD., Kanagawa (JP); HONDA MOTOR CO., LTD., Tokyo (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 18/336,233

(22) Filed: Jun. 16, 2023

(65) Prior Publication Data
US 2023/0415678 A1    Dec. 28, 2023

(30) Foreign Application Priority Data
Jun. 28, 2022 (JP) ................................. 2022-103613

(51) Int. Cl.
B60R 16/023    (2006.01)
B60R 16/033    (2006.01)
H02J 7/00      (2006.01)

(52) U.S. Cl.
CPC ........ *B60R 16/0232* (2013.01); *B60R 16/033* (2013.01); *H02J 7/00714* (2020.01); *H02J 7/007192* (2020.01)

(58) Field of Classification Search
CPC .............. B60R 16/0232; B60R 16/033; B60R 16/0238; B60R 16/03; B60R 16/02;
(Continued)

(56) References Cited

U.S. PATENT DOCUMENTS 5,856,711 A    1/1999  Kato et al.
6,249,848 B1   6/2001  Terada et al.
(Continued)

FOREIGN PATENT DOCUMENTS

JP    H09238425 A  *  3/1996
JP    H10-097419 A    4/1998
(Continued)

OTHER PUBLICATIONS

Fushiya Tomokatsu, Nov. 27, 2017, English Machine Translation_ JP 2019097357 A provided by Patent Translate by EPO and Google (Year: 2017).*

(Continued)

*Primary Examiner* — Ashley L Redhead, Jr.
(74) *Attorney, Agent, or Firm* — Rimon P.C.

(57) ABSTRACT

A power system includes a central unit, a zone unit capable of communicating with the central unit, and a downstream electric wire configured to electrically connect a predetermined downstream unit to the zone unit. A central processor of the central unit executes processing including transmitting electric wire characteristic data stored in a central storage device to the zone unit at a predetermined timing. A zone processor of the zone unit executes processing including writing the electric wire characteristic data transmitted from the central unit into a zone storage device in response (Continued)

to reception of the electric wire characteristic data, and determining whether to turn a semiconductor switch coupled to the downstream electric wire to an OFF state, based on the electric wire characteristic data written into the zone storage device and the current detected by a current sensor.

2 Claims, 7 Drawing Sheets (58) Field of Classification Search
CPC ............ B60R 16/0215; B60R 16/0231; H02J 7/00714; H02J 7/007192; H02H 3/087; H02H 6/005; B60L 1/00
See application file for complete search history.

(56) References Cited

U.S. PATENT DOCUMENTS

| | | |
|---|---|---|
| 6,275,911 B1 | 8/2001 | Terada et al. |
| 6,477,626 B1 | 11/2002 | Terada et al. |
| 2001/0032289 A1 | 10/2001 | Terada et al. |
| 2002/0099905 A1 | 7/2002 | Terada et al. |
| 2002/0162098 A1 | 10/2002 | Suzuki |
| 2003/0041217 A1 | 2/2003 | Terada et al. |
| 2004/0040043 A1 | 2/2004 | Heo |
| 2006/0053235 A1 | 3/2006 | Terada et al. |
| 2016/0094023 A1 | 3/2016 | Kubota et al. |
| 2016/0181866 A1 | 6/2016 | Moeskops |
| 2018/0120797 A1 | 5/2018 | Morita et al. |
| 2019/0165564 A1 | 5/2019 | Fuseya et al. |
| 2019/0366952 A1* | 12/2019 | Ikegaya ............... H02H 1/0061 |
| 2020/0070775 A1* | 3/2020 | Linden ................. B60R 16/033 |
| 2020/0212664 A1* | 7/2020 | Takuma ........... H03K 19/00384 |
| 2021/0039575 A1* | 2/2021 | Hyde ...................... B60R 21/00 |
| 2024/0097677 A1* | 3/2024 | Takahashi ............... B60R 16/03 |

FOREIGN PATENT DOCUMENTS

| | | | | |
|---|---|---|---|---|
| JP | 2002-171659 A | | 6/2002 | |
| JP | 2002-278783 A | | 9/2002 | |
| JP | 2004-086909 A | | 3/2004 | |
| JP | 2013-107453 A | | 6/2013 | |
| JP | 2016-066238 A | | 4/2016 | |
| JP | 2018-069882 A | | 5/2018 | |
| JP | 2019-047569 A | | 3/2019 | |
| JP | 2019097357 A | * | 6/2019 | ......... B60R 16/0207 |
| JP | 2019-209702 A | | 12/2019 | |

OTHER PUBLICATIONS

Kato Akira, Mar. 4, 1996, English Machine Translation_JPH 09238425 A provided by Patent Translate by EPO and Google (Year : 1996).*

Office Action issued on May 7, 2024 in the corresponding Japanese Patent Application No. 2022-103613, and its machine English translation.

Extended European Search Report received in EP Application No. 23181503.6 on Nov. 24, 2023.

\* cited by examiner

| OUTPUT PORT | ELECTRIC WIRE TYPE | ELECTRIC WIRE RESISTANCE r | INITIAL TEMPERATURE T0 | HEAT DISSIPATION RESISTANCE R | THERMAL CAPACITY Cv | SMOKE EMISSION TEMPERATURE Ts | INTERRUPTION MARGIN K |
|---|---|---|---|---|---|---|---|
| 1 | AVSS 0.3 | *** | *** | *** | *** | *** | *** |
| 2 | AVSS 0.5 | *** | *** | *** | *** | *** | *** |
| 3 | AVSS 0.85 | *** | *** | *** | *** | *** | *** |
| ... | ... | ... | ... | ... | ... | ... | ... | zone unit 16a, zone unit 16b, zone unit 16c ...

POWER SYSTEM

CROSS-REFERENCE TO RELATED APPLICATIONS

The present application claims priority from Japanese Patent Application No. 2022-103613 filed on Jun. 28, 2022, the entire contents of which are hereby incorporated by reference.

BACKGROUND

The present disclosure relates to a power system applied to a vehicle.

For example, Japanese Unexamined Patent Application Publication (JP-A) No. 2013-107453 discloses a vehicle diagnosis system in which electronic control units (ECUs) can communicate with each other via a controller area network (CAN). As disclosed in JP-A 2013-107453, a selective wake-up is performed in which a specific electronic control unit wakes up, via the controller area network, an electronic control unit selected from among other electronic control units.

SUMMARY

An aspect of the present disclosure provides a power system. The power system includes a central unit, a zone unit capable of communicating with the central unit, and a downstream electric wire configured to electrically connect a predetermined downstream unit to the zone unit. The zone unit includes one or more zone processors, one or more zone memories coupled to the one or more zone processors, a zone storage device that is electrically writable nonvolatile, a semiconductor switch capable of electrically connecting the downstream electric wire, which is coupled to the downstream unit, to a power supply, and a current sensor configured to detect a current flowing to the downstream electric wire through the semiconductor switch. The central unit comprises one or more central processors, one or more central memories coupled to the one or more central processors, and a central storage device in which electric wire characteristic data indicating a characteristic of the downstream electric wire is stored in advance. The central processor executes processing including transmitting the electric wire characteristic data stored in the central storage device to the zone unit at a predetermined timing. The zone processor executes processing including writing the electric wire characteristic data transmitted from the central unit into the zone storage device in response to reception of the electric wire characteristic data transmitted from the central unit, and determining whether to turn the semiconductor switch coupled to the downstream electric wire to an OFF state, based on the electric wire characteristic data written into the zone storage device and the current detected by the current sensor.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

A vehicle is equipped with a large number of electronic control units that are objects to be selected in a selective wake-up. When a characteristic of an electric wire connected to the electronic control unit, for example, an allowable temperature is different from electronic control unit to electronic control unit, the large number of electronic control units may be individually designed for exclusive use. In a case where electronic control units are individually designed, for example, when a correction, an update or the like occurs in any one of the electronic control units, it is necessary to check operational consistency of the electronic control unit with other electronic control units, leading to complicated development and management of a system mounted on the vehicle. Therefore, it is desired that a plurality of electronic control units have a common configuration.

It is desirable to provide a power system in which electronic control units can have a common configuration.

Hereinafter, embodiments of the present disclosure will be described in detail with reference to the accompanying drawings. The specific dimensions, materials, numerical values, and the like illustrated in the embodiments are merely examples for facilitating the understanding of the disclosure, and do not limit the disclosure unless otherwise specified. In the specification and the drawings, elements having substantially the same functions and configurations are denoted by the same reference signs, and a repeated description thereof is omitted, and elements having no direct relationship with the present disclosure are omitted.

Figure 1:
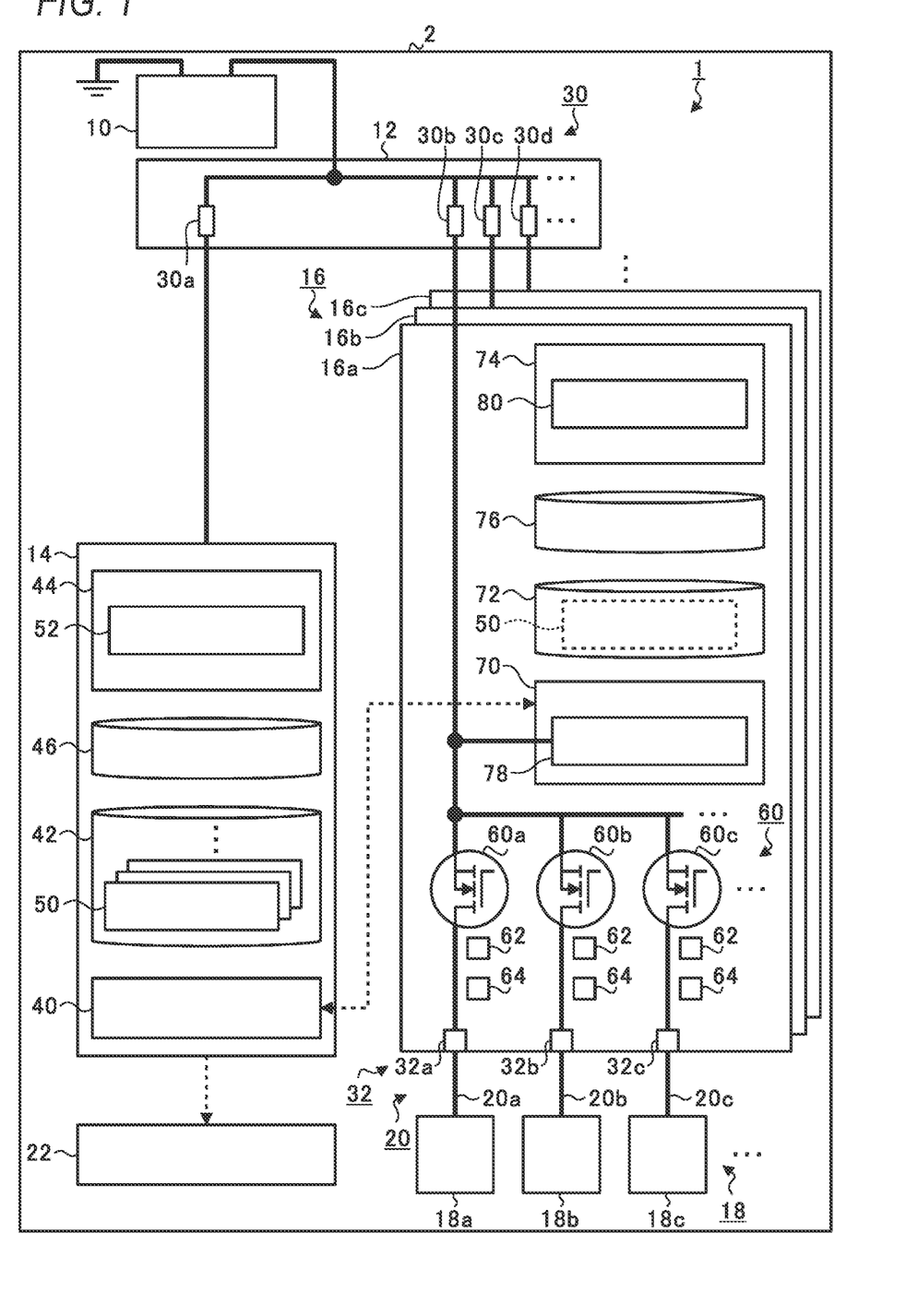
FIG. 1 is a schematic diagram illustrating a configuration of a power system according to an embodiment.

FIG. 1 is a schematic diagram illustrating a configuration of a power system 1 according to the present embodiment. The power system 1 is applied to, for example, a vehicle 2. The vehicle 2 is, for example, an electric automobile including a motor generator as a driving source. The vehicle 2 may be a hybrid electric automobile including a motor generator and an engine as a driving source, or may be an engine vehicle including an engine as a driving source.

The power system 1 includes a battery 10, a fuse box 12, a central unit 14, a plurality of zone units 16a, 16b, and 16c, a plurality of downstream units 18a, 18b, and 18c, a plurality of downstream electric wires 20a, 20b, and 20c, and a notification device 22.

The battery 10 is, for example, a lead storage battery, and is a rechargeable secondary battery. The battery 10 serves as a power supply that supplies electric power to various auxiliary machines, electronic devices, and the like mounted on the vehicle 2.

A plurality of fuses 30a, 30b, 30c, and 30d are accommodated in the fuse box 12. A first terminal of two terminals of the fuse 30a is coupled to the battery 10. A second terminal of the fuse 30a is coupled to the central unit 14. That is, the central unit 14 is electrically coupled to the battery 10 through the fuse 30a.

The central unit 14 is, for example, an electronic control unit (ECU) having the highest rank that collectively controls various devices or electronic control units (ECUs) mounted on the vehicle 2. The central unit 14 will be described in detail later.

A first terminal of two terminals of the fuse 30b is coupled to the battery 10. A second terminal of the fuse 30b is coupled to the zone unit 16a. A first terminal of two terminals of the fuse 30c is coupled to the battery 10. A second terminal of the fuse 30c is coupled to the zone unit 16b. A first terminal of two terminals of the fuse 30d is coupled to the battery 10. A second terminal of the fuse 30d is coupled to the zone unit 16c. That is, the zone units 16a, 16b, and 16c are electrically coupled to the battery 10 through the fuses 30b, 30c, and 30d, respectively.

Hereinafter, the plurality of zone units 16a, 16b, and 16c may be collectively referred to as the zone unit 16. Although three zone units 16a, 16b, and 16c are illustrated in FIG. 1, the number of zone units 16 is not limited to three, and may be one, two, or four or more.

In the power system 1 of the present embodiment, the plurality of zone units 16 have a common configuration. In FIG. 1, for simplification of the drawing, the configuration of the zone unit 16a among the plurality of zone units 16 is illustrated, and the configurations of the other zone units 16 are omitted.

The zone unit 16 is, for example, an electronic control unit (ECU) having a rank lower than the central unit 14 in the network architecture. The zone unit 16 will be described in detail later.

Hereinafter, the plurality of fuses 30a, 30b, 30c, and 30d may be collectively referred to as the fuse 30. Although four fuses 30a, 30b, 30c, and 30d are illustrated in FIG. 1, the number of fuses 30 is not limited to four and may be equal to or greater than a total number of the central unit 14 and the zone units 16.

The zone unit 16 includes a plurality of power supply output ports 32a, 32b, and 32c. Hereinafter, the power supply output ports 32a, 32b, and 32c may be collectively referred to as the power supply output port 32. Although three power supply output ports 32a, 32b, and 32c are illustrated in FIG. 1, the number of power supply output ports 32 is not limited to three, and may be one, two, or four or more.

The downstream unit 18a is electrically coupled to the power supply output port 32a of the zone unit 16a through the downstream electric wire 20a. The downstream unit 18b is electrically coupled to the power supply output port 32b of the zone unit 16a through the downstream electric wire 20b. The downstream unit 18c is electrically coupled to the power supply output port 32c of the zone unit 16a through the downstream electric wire 20c.

Hereinafter, the plurality of downstream units 18a, 18b, and 18c may be collectively referred to as the downstream unit 18. Although three downstream units 18a, 18b, and 18c are illustrated in FIG. 1, the number of downstream units 18 is not limited to three, and may be one, two, or four or more.

The plurality of downstream electric wires 20a, 20b, and 20c may be collectively referred to as the downstream electric wire 20. Although three downstream electric wires 20a, 20b, and 20c are illustrated in FIG. 1, the number of the downstream electric wires 20 is not limited to three, and may be one, two, or four or more as long as being equal to the number of downstream units 18.

As will be described later, the zone unit 16 can supply, through the power supply output port 32, electric power of the battery 10 serving as a power supply to the downstream unit 18 coupled to the power supply output port 32. The "downstream" in the downstream unit 18 and the downstream electric wire 20 means that the downstream unit 18 and the downstream electric wire 20 are located on the opposite side of the zone unit 16 from the power supply, that is, on a distal side of the zone unit 16 on a supply path of electric power supplied from the power supply.

The downstream unit 18 may be any electric device such as an actuator. The downstream unit 18 may be any electronic device such as an electronic control unit (ECU) having a rank lower than the central unit 14 and the zone unit 16 in the network architecture.

The plurality of downstream units 18 may be the same devices or different devices. For example, all of the downstream units 18a, 18b, and 18c may be an electronic control unit. For example, the downstream unit 18a may be an electronic control unit, and the downstream units 18b and 18c may be actuators.

Although not illustrated, another downstream unit 18 may be coupled to another zone unit 16 other than the zone unit 16a through another downstream electric wire 20.

The downstream electric wire 20 electrically connects a predetermined downstream unit 18 to the zone unit 16. For example, the downstream electric wire 20 may be an electric wire for electrical equipment of the vehicle 2 having a high allowable temperature.

The plurality of downstream electric wires 20 have different electric wire types and cross-sectional areas depending on a magnitude of a current required in the downstream unit 18 coupled to the downstream electric wire 20. For example, when the downstream unit 18 is a predetermined actuator, a relatively large current is required to drive the actuator, and thus the actuator is coupled to the zone unit 16 by the downstream electric wire 20 having a relatively large cross-sectional area. On the other hand, for example, when the downstream unit 18 is an electronic control unit, a current required may be smaller than that of the actuator, and thus the electronic control unit may be coupled to the zone unit 16 by the downstream electric wire 20 having a relatively small cross-sectional area.

The plurality of downstream electric wires 20 have different allowable currents depending on the electric wire types and cross-sectional areas thereof. When the current flowing in the downstream electric wire 20 increases, the amount of heat generated in the downstream electric wire 20 increases, and the temperature of the downstream electric wire 20 may exceed an allowable temperature in some cases. Here, as will be described later, a fuse function of interrupting the supply of electric power to the downstream electric wire 20 and the downstream unit 18 before the temperature of the downstream electric wire 20 exceeds the allowable temperature is provided in the zone unit 16.

Here, when the cross-sectional areas of the downstream electric wires 20 coupled to the zone units 16 are different from one another, the allowable currents of the downstream electric wires 20 are different from one another. Therefore, it is necessary to design the fuse functions of the zone units 16 individually. In a case where the plurality of zone units 16 are individually designed for exclusive use, for example, when a correction, an update, or the like occurs in any one of the zone units 16, it is necessary to check operational consistency of the zone unit 16 with other zone units 16, leading to complicated development and management of a system mounted on the vehicle 2.

Therefore, in the power system 1, the central unit 14 collectively manages data indicating characteristics of the downstream electric wires 20 related to the fuse functions of the zone units 16. Accordingly, the plurality of zone units 16 can be made to have a common configuration, and a burden of the development and management of the system can be reduced.

The central unit 14 includes a central communication device 40, a central storage device 42, one or more central processors 44, and one or more central memories 46 coupled to the one or more central processors 44.

The central communication device 40 constitutes a communication network such as a controller area network (CAN) with communication devices of other electronic control units mounted on the vehicle 2. The central unit 14 can communicate with the zone unit 16 described later through the central communication device 40.

The central storage device 42 includes a nonvolatile storage element. The nonvolatile storage element may include an electrically readable and writable nonvolatile storage element such as a flash memory.

In the central storage device 42, a plurality of pieces of electric wire characteristic data 50 are stored in advance. The electric wire characteristic data 50 is stored correspondingly to the number of zone units 16.

Figure 2:
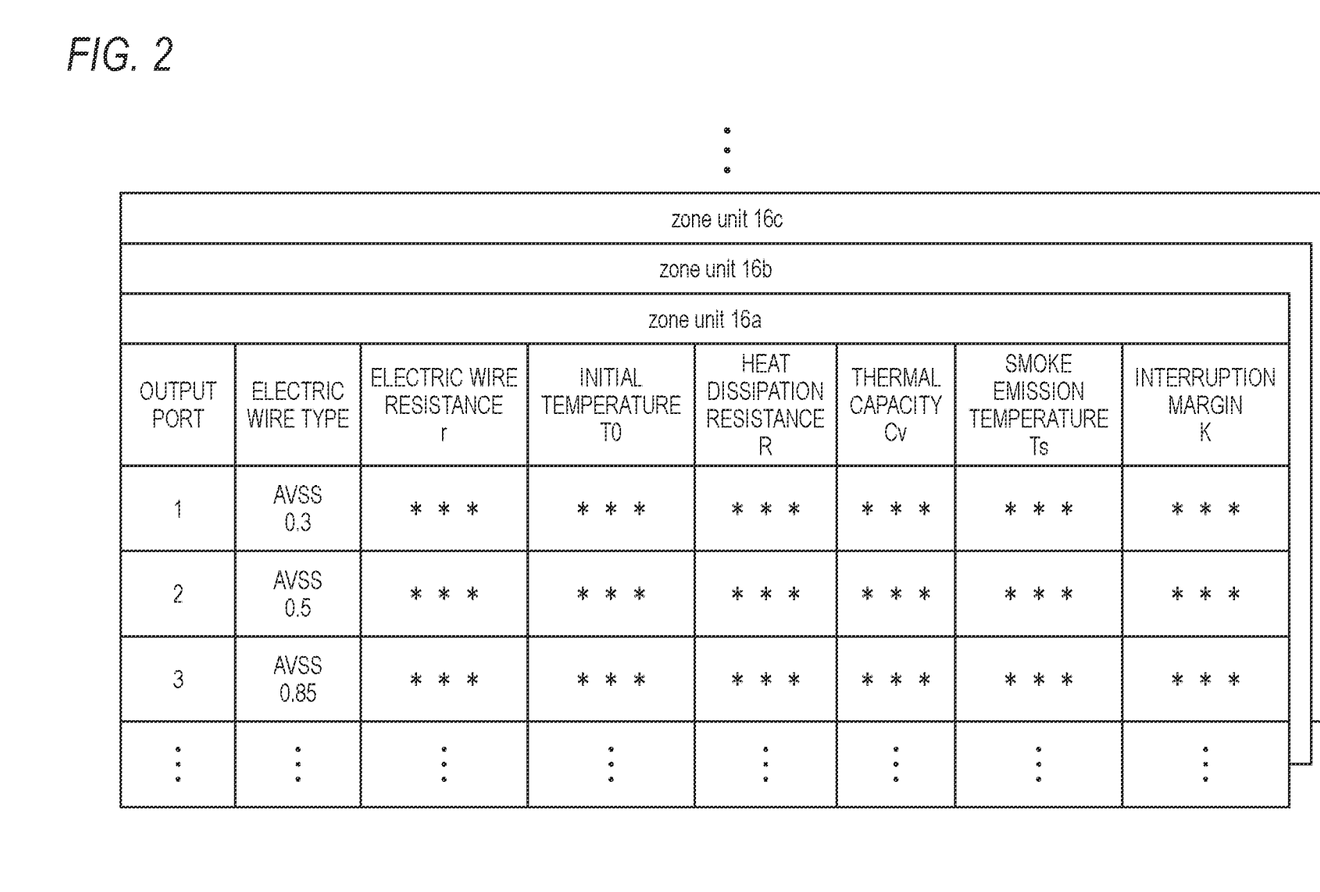
FIG. 2 is a diagram illustrating an example of electric wire characteristic data.

FIG. 2 is a diagram illustrating an example of the electric wire characteristic data 50. In the electric wire characteristic data 50, values of various indices related to the downstream electric wire 20 coupled to the zone unit 16 are set for each power supply output port 32.

For example, in the electric wire characteristic data 50, values of the power supply output port 32, a type of an electric wire, a resistance r of the electric wire, an initial temperature T0 of the electric wire, a heat dissipation resistance R of the electric wire, a thermal capacity Cv of the electric wire, a smoke emission temperature of the electric wire, and an interruption margin K are associated with each other.

The type of an electric wire is the type of the downstream electric wire 20 coupled to the power supply output port 32. The resistance r of the electric wire indicates an electric resistance value of the downstream electric wire 20 coupled to the power supply output port 32. The initial temperature T0 of the electric wire is, for example, a fixed value such as 80° C., and is set by assuming a temperature of an interior of the vehicle 2 at the time when the vehicle 2 is left in midsummer. The heat dissipation resistance R of the electric wire indicates difficulty in dissipating heat of the downstream electric wire 20 coupled to the power supply output port 32. The thermal capacity Cv of the electric wire indicates an amount of heat required to raise the temperature of the downstream electric wire 20 coupled to the power supply output port 32 by a unit temperature. The smoke emission temperature of the electric wire indicates a temperature at which smoke is emitted from a cover of the downstream electric wire 20 coupled to the power supply output port 32. The interruption margin K is an index indicating to what degree a reference for determining whether to interrupt the supply of electric power through the power supply output port 32 is set to a safe side.

As will be described later, the electric wire characteristic data 50 is used in the zone unit 16 to determine whether to interrupt the supply of electric power to the downstream unit 18 coupled through the downstream electric wire 20.

Returning to FIG. 1, the central memory 46 includes a ROM, in which programs and the like are stored, and a RAM serving as a work area. The central processor 44 implements various types of control of the central unit 14 in cooperation with programs stored in the central memory 46. The central processor 44 also serves as a central control unit 52 by executing a program. The central control unit 52 will be described in detail later.

The zone unit 16 includes a plurality of semiconductor switches 60a, 60b, and 60c. Hereinafter, the plurality of semiconductor switches 60a, 60b, and 60c may be collectively referred to as the semiconductor switch 60. Although three semiconductor switches 60a, 60b, and 60c are illustrated in FIG. 1, the number of semiconductor switches 60 is not limited to three, and may be one, two, or four or more. The number of the semiconductor switches 60 is the same as the number of the power supply output ports 32.

The semiconductor switch 60 is, for example, a metal oxide semiconductor field effect transistor (MOSFET). The semiconductor switch 60 has a first terminal, a second terminal, and a control terminal.

The first terminal of the semiconductor switch 60a, the first terminal of the semiconductor switch 60b, and the first terminal of the semiconductor switch 60c are coupled to the fuse 30 of the fuse box 12. The second terminal of the semiconductor switch 60a is coupled to the power supply output port 32a. The second terminal of the semiconductor switch 60b is coupled to the power supply output port 32b. The second terminal of the semiconductor switch 60c is coupled to the power supply output port 32c.

The semiconductor switch 60 can switch on and off connection between the first terminal and the second terminal of the semiconductor switch 60 based on a voltage input to the control terminal. That is, the semiconductor switch 60 can electrically connect, to the power supply, the power supply output port 32, the downstream electric wire 20, and the downstream unit 18 that are coupled to the semiconductor switch 60.

In one example, when the semiconductor switch 60a is in an ON state, the electric power of the battery 10 is supplied to the downstream unit 18a through the semiconductor switch 60a and the downstream electric wire 20a. When the semiconductor switch 60a is in an OFF state, the downstream electric wire 20a and the downstream unit 18a are electrically disconnected from the battery 10. Similarly, when the semiconductor switch 60b is in the ON state, the electric power of the battery 10 is supplied to the downstream unit 18b through the semiconductor switch 60b and the downstream electric wire 20b. When the semiconductor switch 60b is in the OFF state, the downstream electric wire 20b and the downstream unit 18b are electrically disconnected from the battery 10. When the semiconductor switch 60c is in the ON state, the electric power of the battery 10 is supplied to the downstream unit 18c through the semiconductor switch 60c and the downstream electric wire 20c. When the semiconductor switch 60c is in the OFF state, the downstream electric wire 20c and the downstream unit 18c are electrically disconnected from the battery 10.

The zone unit 16 includes a current sensor 62 and an element temperature sensor 64. The current sensor 62 and the element temperature sensor 64 are provided for each semiconductor switch 60. The current sensor 62 detects a current flowing through the semiconductor switch 60 and the power supply output port 32 to the downstream electric wire 20 coupled to the power supply output port 32. The element temperature sensor 64 detects a temperature of the semiconductor switch 60.

The zone unit 16 includes a zone communication device 70, a zone storage device 72, one or more zone processors 74, and one or more zone memories 76 coupled to the one or more zone processor 74.

The zone communication device 70 constitutes a communication network such as the controller area network (CAN) with communication devices of other electronic control units mounted on the vehicle 2. The zone unit 16 can communicate with the central unit 14 through the zone communication device 70.

The zone communication device 70 includes a zone power supply driver 78. The zone power supply driver 78 is electrically coupled to the fuse 30 of the fuse box 12.

Here, the central communication device 40 of the central unit 14 can transmit a unique identifier for identifying the zone unit 16 to the zone communication device 70 of the zone unit 16 through the controller area network. The zone power supply driver 78 of the zone communication device 70 can receive the unique identifier transmitted from the central communication device 40.

If the received unique identifier is an identifier for identifying the zone unit 16 to which the own device (the zone power supply driver 78) belongs, the zone power supply driver 78 wakes up the zone unit 16 to which the own device (the zone power supply driver 78) belongs. Specifically, the zone power supply driver 78 wakes up the zone unit 16, to which the own device (the zone power supply driver 78) belongs, by supplying electric power supplied from the battery 10 through the fuse 30 to the zone processor 74 of the zone unit 16 to which the own device (the zone power supply driver 78) belongs.

The central control unit 52 transmits a unique identifier of the zone unit 16 selected from the plurality of zone units 16, thereby selectively waking up the selected zone unit 16. That is, the central unit 14 and the zone unit 16 have a selective wake-up function using CAN communication.

The zone storage device 72 includes an electrically writable nonvolatile storage element. For example, in an initial state before the manufacture of the vehicle 2 to which the power system 1 is applied is completed, at least the electric wire characteristic data 50 is not stored in the zone storage device 72. However, as will be described later, when a predetermined timing elapses, the electric wire characteristic data 50 corresponding to the zone units 16 among the electric wire characteristic data 50 stored in the central storage device 42 is written into the zone storage device 72. In FIG. 1, the electric wire characteristic data 50 in the zone storage device 72 is indicated by a rectangle of a broken line, indicating that the electric wire characteristic data 50 is written into the zone storage device 72.

The zone memory 76 includes a ROM, in which programs and the like are stored, and a RAM serving as a work area. The zone processor 74 implements various types of control of the zone unit 16 in cooperation with programs stored in the zone memory 76. The zone processor 74 also serves as a zone control unit 80 by executing a program.

The zone control unit 80 is configured to turn on and off the individual semiconductor switches 60 in the same manner as a relay, and to allow the semiconductor switches 60 to serve as fuses.

For example, in a situation where a current flowing in the downstream electric wire 20 coupled to the semiconductor switch 60 is an overcurrent, the zone control unit 80 brings the semiconductor switch 60 into the OFF state to interrupt the current of the downstream electric wire 20. Here, in the situation where a current flowing through the downstream electric wire 20 is an overcurrent, the temperature of the downstream electric wire 20 is increased. Therefore, the zone control unit 80 derives a temperature estimation value, which is an estimation value of the temperature of the downstream electric wire 20, based on a measurement value of the current flowing in the downstream electric wire 20. Then, when the temperature estimation value exceeds a predetermined temperature, the zone control unit 80 regards the current of the downstream electric wire 20 as an overcurrent, and brings the semiconductor switch 60 coupled to the downstream electric wire 20 into the OFF state. By performing such control, the semiconductor switch 60 can function as a fuse.

As described above, the downstream electric wire 20 coupled to the zone unit 16 differs depending on the downstream unit 18 coupled to the downstream electric wire 20. In this case, a condition for controlling the semiconductor switch 60 as a fuse is different from downstream electric wire 20 to downstream electric wire 20.

Therefore, in the power system 1, data used for deriving the temperature estimation value of the downstream electric wire 20 and a program corresponding to a derivation formula for deriving the temperature estimation value are separated. Further, in the power system 1, data used for determining the predetermined temperature serving as a reference for the determination to bring the semiconductor switch 60 into the OFF state and a program corresponding to a determination formula for determining the predetermined temperature are separated.

Hereinafter, for convenience of description, the program corresponding to the derivation formula for deriving the temperature estimation value may be referred to as a temperature estimation program. A program corresponding to a determination formula for determining the predetermined temperature may be referred to as a predetermined temperature determination program.

In the power system 1, the temperature estimation program and the predetermined temperature determination program are stored in the zone memory 76 in advance. On the other hand, in the power system 1, the data used for deriving the temperature estimation value and the data used for determining the predetermined temperature are stored in advance in the central storage device 42 as the electric wire characteristic data 50.

The electric wire characteristic data 50 is transmitted from the central unit 14 to the zone unit 16 and written in the zone storage device 72 at a predetermined timing. The predetermined timing is, for example, a timing at which the central unit 14 receives empty state information, which indicates that the electric wire characteristic data 50 is not stored in the zone storage device 72, from the zone unit 16, as described later. The timing is not limited to the predetermined timing or an exemplified timing, and may be any timing such as a timing at which the electric wire characteristic data 50 is required in the zone unit 16.

With respect to the temperature estimation program and the predetermined temperature determination program, the same program can be used regardless of the type of the downstream electric wire 20. Therefore, even if the temperature estimation program and the predetermined temperature determination program are stored in the zone memory 76 in advance, the plurality of zone units 16 can have exactly the same configuration before electric wire characteristic data 50 is written into the respective zone storage devices 72. That is, the plurality of zone units 16 can be mass-produced with one specification.

By writing the electric wire characteristic data 50 into the zone storage device 72, it is possible to cause the plurality of zone units 16 to function as separate zone units 16 in accordance with the downstream electric wires 20 coupled to the zone units 16.

In one example, the zone control unit 80 can derive the temperature estimation value of the downstream electric wire 20 by executing the temperature estimation program stored in the zone memory 76 using the electric wire characteristic data 50 written in the zone storage device 72. The zone control unit 80 can determine the predetermined temperature by executing the predetermined temperature determination program stored in the zone memory 76 using the electric wire characteristic data 50 written in the zone storage device 72. The zone control unit 80 can determine whether to bring the semiconductor switch 60 into the OFF state based on the temperature estimation value and the predetermined temperature.

The temperature estimation program may be, for example, a program for realizing formula (1):

$$T[n] = \Sigma\{I[n]^2 r - (T[n-1] - T0)/R\}/Cv \times \Delta t + T0 \qquad (1)$$

where n represents the number of repetitions of a series of processing repeated in a predetermined cycle; T[n] indicates a temperature estimation value at a time point of an n-th repetition; I indicates a measurement value of a current at the time point of the n-th repetition; r indicates a resistance of an electric wire; T[n−1] indicates a temperature estimation value at a time point of a (n−1)-th repetition, that is, at the previous repetition; T0 indicates an initial temperature of the electric wire; R indicates a heat dissipation resistance of the electric wire; Cv indicates a thermal capacity of the electric wire; and Δt indicates a time difference between the time point of the (n−1)-th repetition and the time point of the n-th repetition, that is, the predetermined cycle.

As illustrated in formula (1), with the temperature estimation program, a current temperature estimation value is derived by integrating the amount of change in temperature changed during the predetermined cycle for full predetermined cycles.

In addition, the predetermined temperature determination program may be a program that realizes formula (2):

$$Tth = Ts + K \qquad (2)$$

where Tth indicates a predetermined temperature; Ts indicates a smoke emission temperature of the electric wire; and K indicates an interruption margin. As illustrated in formula (2), the predetermined temperature is determined to be a temperature lower than the smoke emission temperature by the interruption margin.

The present disclosure is not limited to a mode in which the predetermined temperature is determined using two indices, i.e., the smoke emission temperature and the interruption margin. For example, the predetermined temperature may be included in the electric wire characteristic data 50 as an index. In this case, the predetermined temperature included in the electric wire characteristic data 50 may be used as it is, and the predetermined temperature determination program may be omitted.

Figure 3:
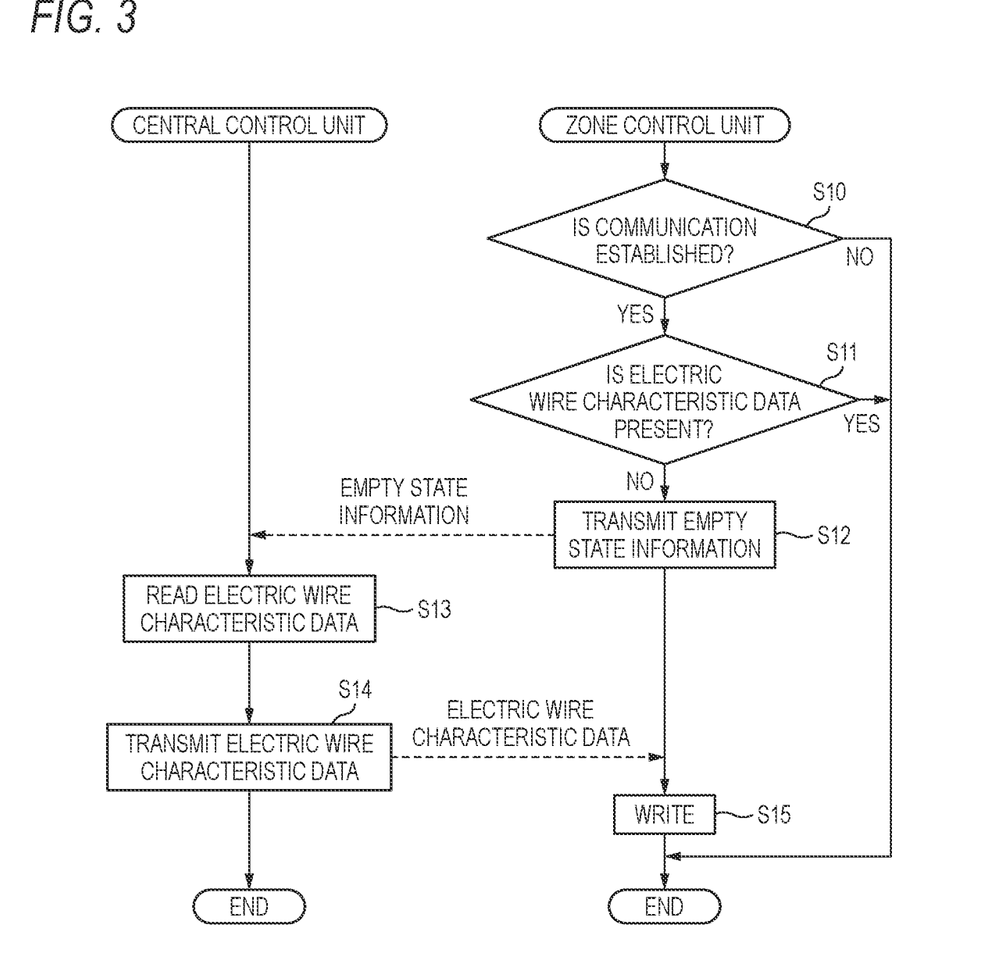
FIG. 3 is a sequence chart illustrating a flow of processing of writing electric wire characteristic data into a zone storage device.

FIG. 3 is a sequence chart illustrating a flow of processing of writing the electric wire characteristic data 50 to the zone storage device 72. When a predetermined interrupt timing that arrives at a predetermined cycle comes, the zone control unit 80 determines whether communication with the central unit 14 is established (S10). When it is determined that the communication is not established (NO in S10), the zone control unit 80 ends the series of processing illustrated in FIG. 3.

When it is determined that the communication with the central unit 14 is established (YES in S10), the zone control unit 80 determines whether the electric wire characteristic data 50 is stored in the zone storage device 72 (S11). When it is determined that the electric wire characteristic data 50 is stored in the zone storage device 72 (YES in S11), the zone control unit 80 ends the series of processing illustrated in FIG. 3.

When it is determined that the electric wire characteristic data 50 is not stored in the zone storage device 72 (NO in S11), the zone control unit 80 transmits empty state information indicating that the electric wire characteristic data 50 is not stored to the central unit 14 through the zone communication device 70 (S12).

When receiving the empty state information through the central communication device 40, the central control unit 52 reads the electric wire characteristic data 50 corresponding to the zone unit 16, which is a transmission source of the empty state information, from the central storage device 42 (S13). The central control unit 52 transmits the read electric wire characteristic data 50 to the zone unit 16, which is the transmission source of the empty state information, through the central communication device 40 (S14).

When the zone control unit 80 receives the electric wire characteristic data 50 through the zone communication device 70, the zone control unit 80 writes the received electric wire characteristic data 50 into the zone storage device 72 (S15), and ends the series of processing illustrated in FIG. 3. When the electric wire characteristic data 50 is written into the zone storage device 72, the zone control unit 80 may turn on a writing flag indicating that the writing is completed.

By writing the electric wire characteristic data 50 into the zone storage device 72 as described, the zone control unit 80 can use the electric wire characteristic data 50 written into the zone storage device 72 thereafter. For example, based on the electric wire characteristic data 50 written in the zone storage device 72 and a current detected by the current sensor 62, the zone control unit 80 can determine whether to bring the semiconductor switch 60 coupled to the downstream electric wire 20 into the OFF state.

When a specific condition is satisfied, the central control unit 52 may determine whether the electric wire characteristic data 50 stored in the central storage device 42 coincides with the electric wire characteristic data 50 stored in the zone storage device 72 of the zone unit 16. That is, the central control unit 52 may verify whether a writing error of the electric wire characteristic data 50 occurs in the zone storage device 72.

Figure 4:
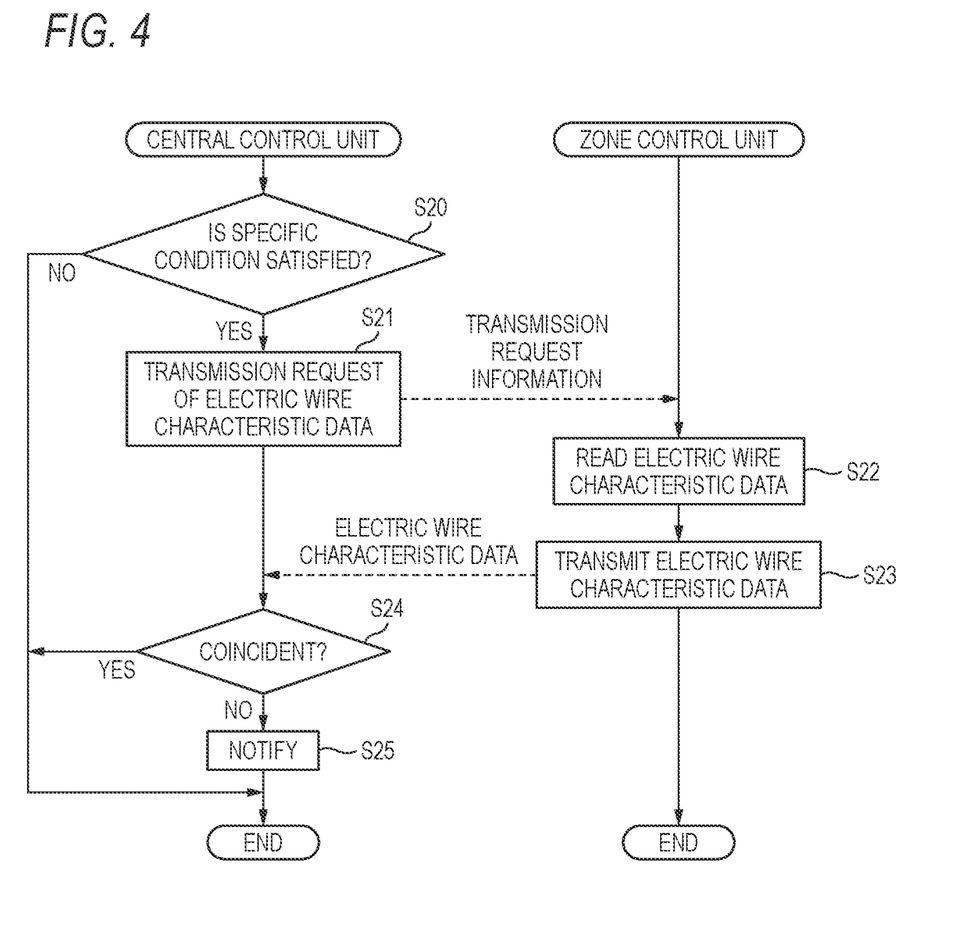
FIG. 4 is a sequence chart illustrating a flow of processing relating to verification of whether a writing error of electric wire characteristic data occurs.

FIG. 4 is a sequence chart illustrating a flow of processing relating to verification of whether a writing error of the electric wire characteristic data 50 occurs. When a predetermined interrupt timing that arrives at a predetermined cycle comes, the central control unit 52 determines whether a specific condition is satisfied (S20).

For example, when the vehicle 2 is repaired at a dealer or the like, the central control unit 52 may determine that the specific condition is satisfied. At a timing when the ignition of the vehicle 2 is turned on and a driving cycle is started, the central control unit 52 may determine that the specific condition is satisfied. Further, for example, the central control unit 52 may determine that the specific condition is satisfied every time a predetermined period of time elapses, such as every day.

When it is determined that the specific condition is not satisfied (NO in S20), the central control unit 52 ends the series of processing illustrated in FIG. 4.

When it is determined that the specific condition is satisfied (YES in S20), the central control unit 52 transmits transmission request information for requesting transmission of the electric wire characteristic data 50 written in the zone storage device 72 to the zone unit 16 through the central communication device 40 (S21).

When receiving the transmission request information through the zone communication device 70, the zone control unit 80 reads the electric wire characteristic data stored in the zone storage device 72 (S22). The zone control unit 80 transmits the read electric wire characteristic data 50 to the central unit 14 through the zone communication device 70 (S23).

The central control unit 52 can acquire the electric wire characteristic data 50 written in the zone storage device 72 by receiving the electric wire characteristic data 50 from the zone unit 16 through the central communication device 40. The central control unit 52 determines whether the electric wire characteristic data 50 acquired from the zone unit 16 coincides with the electric wire characteristic data 50 corresponding to the zone unit 16 stored in the central storage device 42 (S24).

When the electric wire characteristic data 50 acquired from the zone unit 16 coincides with the electric wire characteristic data 50 corresponding to the zone unit 16 stored in the central storage device 42 (YES in S24), the central control unit 52 ends the series of processing illustrated in FIG. 4.

When the electric wire characteristic data 50 acquired from the zone unit 16 does not coincide with the electric wire characteristic data 50 corresponding to the zone unit 16 stored in the central storage device 42 (NO in S24), the central control unit 52 causes the notification device 22 to make a notification about a writing error of the electric wire characteristic data 50 (S25). The notification device 22 may be any device capable of appropriately making a notification to an occupant of the vehicle 2, such as a warning lamp of an instrument panel.

As described, by verifying the writing error of the electric wire characteristic data 50 in the zone storage device 72, the writing error of the electric wire characteristic data 50 can be found at an early stage, and the error can be appropriately handled. As a result, it is possible to correct a failure in the control over the semiconductor switch 60, which is performed using the electric wire characteristic data 50, appropriately at an early stage.

In the above description, it is assumed that the zone unit 16 and the downstream unit 18 are in a woken-up state. However, the zone unit 16 and the downstream unit 18 can also be caused to sleep. For example, when processing of causing a sleeping electronic control unit to take charge occurs, the electronic control unit needs to be woken up from a sleeping state.

As a method of waking up an electronic control unit, there is a selective wake-up in which a specific electronic control unit wakes up, through a controller area network, an electronic control unit selected from among a plurality of other electronic control units. In order to implement the selective wake-up, it is necessary to provide, in the electronic control unit to be woken up, a power supply driver for waking up the electronic control unit according to communication. However, since a large number of electronic control units are mounted on the vehicle 2, providing power supply drivers for all the electronic control units leads to an increase in cost.

Therefore, in the power system 1, the selective wake-up is applied to the zone unit 16, and the selective wake-up is not applied to the downstream unit 18. In one example, the zone unit 16 is provided with the zone power supply driver 78 for waking up the zone unit 16 itself according to communication. In contrast, the downstream unit 18 is not provided with a power supply driver for waking up the downstream unit 18 itself according to communication. With respect to the downstream unit, the semiconductor switch of the zone unit is brought into the ON state to wake up the downstream unit.

As described, in the power system 1, since the power supply driver for implementing the selective wake-up is omitted in the downstream unit 18, it is possible to reduce the cost by an amount corresponding to the power supply driver omitted.

Figure 5:
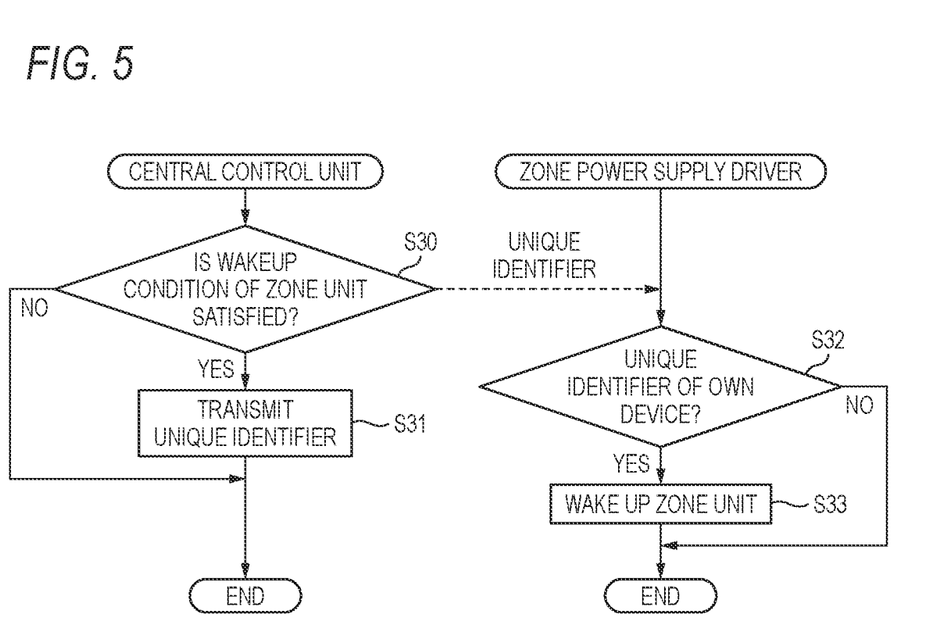
FIG. 5 is a sequence chart illustrating a flow of processing of waking up a zone unit.

FIG. 5 is a sequence chart illustrating a flow of processing of waking up the zone unit 16. When a predetermined interrupt timing that arrives at a predetermined cycle comes, the central control unit 52 determines, for all the zone units 16, whether a wakeup condition of the zone unit 16 is satisfied (S30). For example, when processing that the zone unit 16 takes charge of occurs with the zone unit 16 being in the sleeping state, the central control unit 52 may determine that the wakeup condition of the zone unit 16 is satisfied.

When it is determined that the wakeup condition of the zone unit 16 is satisfied for none of the zone units 16 (NO in S30), the central control unit 52 ends the series of processing in FIG. 5.

When it is determined that the wakeup condition of the zone unit 16 is satisfied for at least one of the zone units 16 (YES in S30), the central control unit 52 transmits a unique identifier of the zone unit 16 for which the wakeup condition is satisfied to the zone unit 16 through the central communication device 40 (S31).

With respect to the zone power supply driver 78 of the zone communication device 70 belonging to the zone unit 16 to which the unique identifier is transmitted, when the received unique identifier is a unique identifier for identifying the zone unit 16 to which the zone power supply driver 78 of the zone communication device 70 belongs (YES in S32), the zone power supply driver 78 of the zone communication device 70 wakes up the zone unit 16 to which the zone power supply driver 78 of the zone communication device 70 belongs (S33).

When the received unique identifier is not the unique identifier for identifying the zone unit 16 to which the zone power supply driver 78 of the zone communication device 70 belongs (NO in S32), the zone power supply driver 78 of the zone communication device 70 does not perform the wake-up of the zone unit 16 to which the zone power supply driver 78 of the zone communication device 70 belongs, and ends the series of processing illustrated in FIG. 5.

Here, the selective wake-up function like that for the zone unit 16 is not provided for the downstream unit 18. That is, the downstream unit 18 does not have a power supply driver capable of waking up the downstream unit 18 according to communication.

Therefore, the cost of the downstream unit 18 can be reduced as compared with a mode in which the downstream unit 18 is provided with the selective wake-up function.

In the power system 1, when the semiconductor switch 60 of the zone unit 16 is brought into the ON state, electric power is supplied to the downstream unit 18, and the downstream unit 18 can be woken up.

Figure 6:
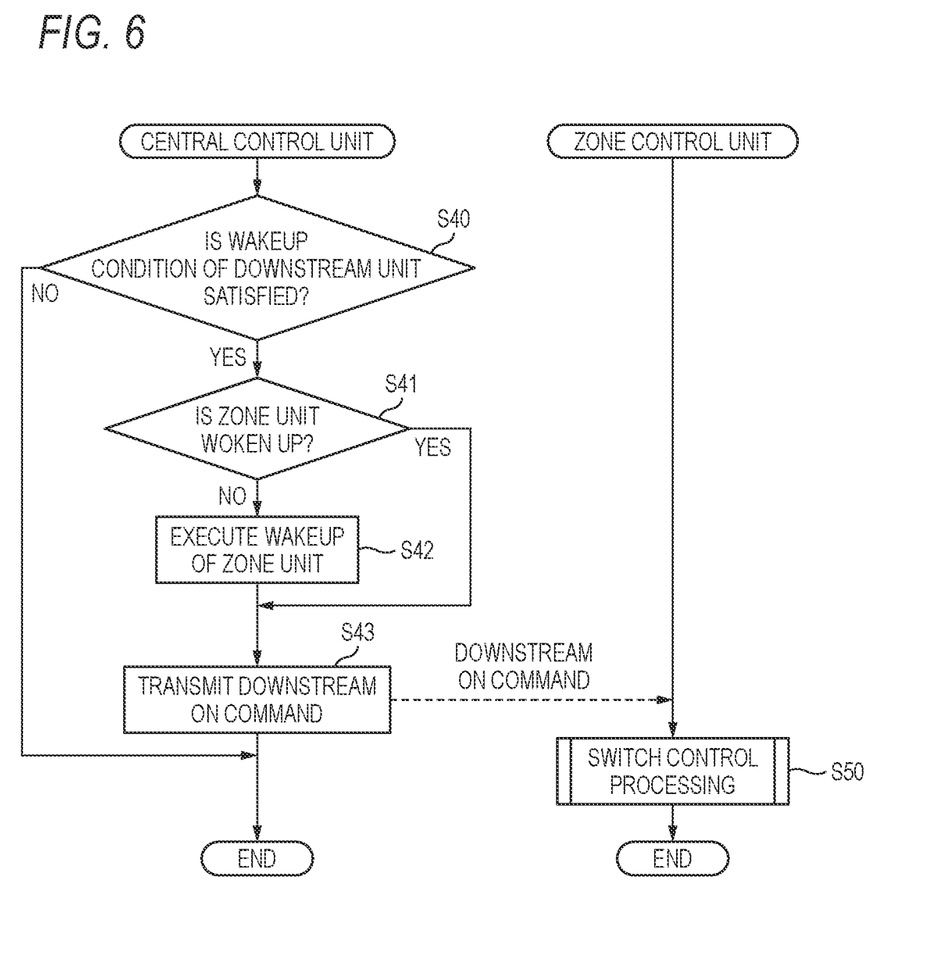
FIG. 6 is a sequence chart illustrating a flow of processing of waking up a downstream unit.

FIG. 6 is a sequence chart illustrating a flow of processing of waking up the downstream unit 18. When a predetermined interrupt timing that arrives at a predetermined cycle comes, the central control unit 52 determines, for all the downstream units 18, whether a wakeup condition of the downstream unit 18 is satisfied (S40). For example, when processing that the downstream unit 18 takes charge of occurs with the downstream unit 18 being in a sleeping state, the central control unit 52 may determine that the wakeup condition of the downstream unit 18 is satisfied.

When it is determined that the wakeup condition of the downstream unit 18 is satisfied for none of the downstream units 18 (NO in S40), the central control unit 52 ends the series of processing in FIG. 6.

When it is determined that the wakeup condition of the downstream unit 18 is satisfied for at least one of the downstream units 18 (YES in S40), the central control unit 52 determines whether the zone unit 16, to which the downstream unit 18 for which the wakeup condition is satisfied is connected, is woken up (S41).

When it is determined that the zone unit 16, to which the downstream unit 18 for which the wakeup condition is satisfied is connected, is not woken up (NO in S41), the central control unit 52 executes the wakeup of the zone unit 16 (S42). In one example, the central control unit 52 wakes up the zone unit 16 by executing the series of processing in FIG. 5 described above. In a case of not performing the wakeup of the downstream unit 18 and only waking up the zone unit 16, only the processing in FIG. 5 may be performed without performing the processing in FIG. 6.

After waking up the zone unit 16, the central control unit 52 transmits, to the zone unit 16 through the central communication device 40, a downstream ON command that is a command to supply electric power to the downstream unit 18 for which the wakeup condition is satisfied (S43). The downstream ON command corresponds to a command for waking up the downstream unit 18. The downstream ON command includes information for specifying the downstream unit 18 to be woken up.

When the zone unit 16, to which the downstream unit 18 for which the wakeup condition is satisfied is connected, is woken up (YES in S41), the central control unit 52 omits step S42 of waking up the zone unit 16, and transmits a downstream ON command for the downstream unit 18 for which the wakeup condition is satisfied to the zone unit 16 through the central communication device 40 (S43).

In step S40, when there are a plurality of downstream units 18 for which the wakeup condition is satisfied, the central control unit 52 performs the processing of step S41 and following steps for all the downstream units 18 for which the wakeup condition is satisfied.

Here, the zone control unit 80 repeatedly executes switch control processing (S50), which is processing of controlling the semiconductor switch 60, every time a predetermined interrupt timing that arrives at a predetermined cycle comes. The switch control processing (S50) will be described later.

When the downstream ON command is received through the zone communication device 70, the zone control unit 80 determines that the downstream ON command is received in reception determination of the downstream ON command in the switch control processing (S50), and the switch control processing (S50) proceeds.

The processing of interrupting the electric power to the downstream unit 18 can be performed in the same manner as the processing of supplying electric power to the downstream unit 18 described with reference to FIG. 6. That is, when a condition for interrupting the electric power to the downstream unit 18 is satisfied, if the zone unit 16 is not woken up, the central control unit 52 wakes up the zone unit 16. Then, in a state where the zone unit 16 is woken up, the central control unit 52 transmits a downstream OFF command, which is a command for interrupting the electric power to the downstream unit 18, to the zone unit 16 through the central communication device 40. The downstream OFF command includes information for specifying the downstream unit 18 to which the electric power is to be interrupted.

When the downstream OFF command is received through the zone communication device 70, the zone control unit 80 determines that the downstream OFF command is received in reception determination of the downstream OFF command in the switch control processing (S50), and the switch control processing (S50) proceeds.

Figure 7:
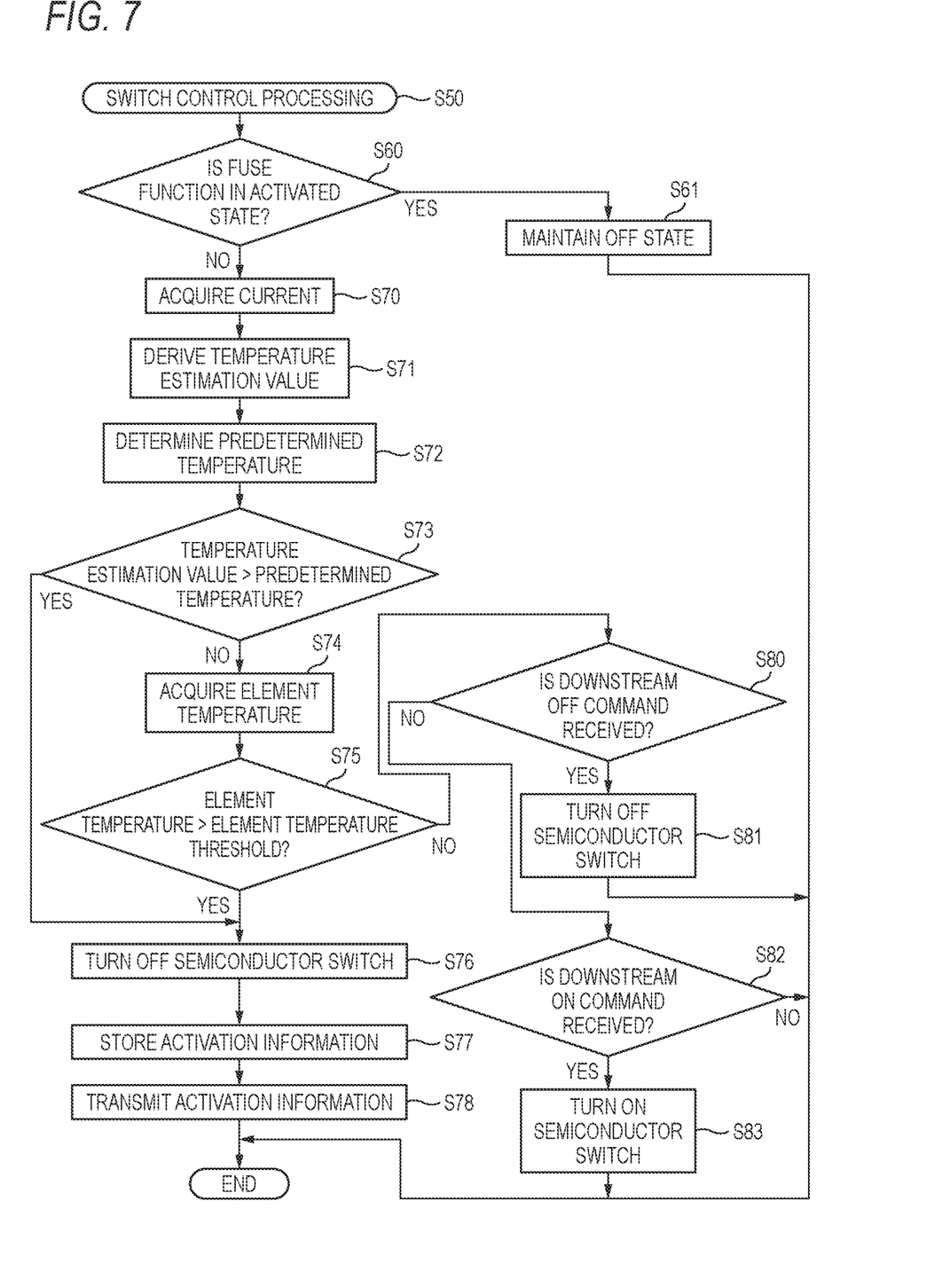
FIG. 7 is a flowchart illustrating a flow of switch control processing.

FIG. 7 is a flowchart illustrating the flow of the switch control processing (S50). The switch control processing (S50) illustrated in FIG. 7 is executed in parallel for individual semiconductor switches 60. Content of the switch control processing (S50) is common for a plurality of semiconductor switches 60. Hereinafter, for convenience of description, the switch control processing (S50) corresponding to one semiconductor switch 60 will be described, and a description of the switch control processing (S50) corresponding to another semiconductor switch 60 will be omitted. In addition, in principle, the semiconductor switch 60 described in the switch control processing in FIG. 7 indicates the semiconductor switch 60 corresponding to the switch control processing (S50).

Here, as will be described later, when the fuse function is activated in the semiconductor switch 60 and the semiconductor switch 60 is changed from the ON state to the OFF state, activation information indicating that the fuse function is activated is stored in the zone memory 76.

When the switch control processing (S50) is started, the zone control unit 80 determines whether the fuse function of the semiconductor switch 60 is in an activated state (S60). For example, when the activation information of the semiconductor switch 60 is stored in the zone memory 76, the zone control unit 80 determines that the fuse function of the semiconductor switch 60 is in the activated state.

When it is determined that the fuse function is in the activated state (YES in S60), the zone control unit 80 maintains the semiconductor switch 60 in the OFF state (S61), and ends the present switch control processing (S50).

When it is determined that the fuse function is not in the activated state (NO in S60), the zone control unit 80 acquires a current detected by the current sensor 62 corresponding to the semiconductor switch 60 (S70).

The zone control unit 80 derives a temperature estimation value, which is an estimation value of a temperature of the downstream electric wire 20 corresponding to the semiconductor switch 60, based on the acquired current and the electric wire characteristic data 50 written in the zone storage device 72 (S71). For example, the zone control unit 80 derives the temperature estimation value by executing the temperature estimation program using the acquired current and the electric wire characteristic data 50.

Next, the zone control unit 80 determines a predetermined temperature indicating a reference for determining whether to activate the fuse function, based on the electric wire characteristic data 50 written in the zone storage device 72 (S72). For example, the zone control unit 80 determines the predetermined temperature by executing the predetermined temperature determination program using the electric wire characteristic data 50.

Next, the zone control unit 80 determines whether the temperature estimation value is greater than the predetermined temperature (S73). When the temperature estimation value is equal to or less than the predetermined temperature (NO in S73), the zone control unit 80 acquires an element temperature detected by the element temperature sensor 64 corresponding to the semiconductor switch 60 (S74).

The zone control unit 80 determines whether the acquired element temperature is greater than an element temperature threshold (S75). The element temperature threshold is stored in advance in the zone memory 76, for example.

When the temperature estimation value is greater than the predetermined temperature (YES in S73) or the element temperature is greater than the element temperature threshold (YES in S75), the zone control unit 80 brings the semiconductor switch 60 into the OFF state (S76). In this case, the fuse function of the semiconductor switch 60 is activated to bring the semiconductor switch 60 into the OFF state. Therefore, the zone control unit 80 causes the zone memory 76 to store activation information indicating that the fuse function is activated (S77). Then, the zone control unit 80 transmits the activation information to the central unit 14 through the zone communication device 70 (S78), and ends the present switch control processing (S50).

In step S75, when the element temperature is equal to or lower than the element temperature threshold (NO in S75), the zone control unit 80 determines whether a downstream OFF command for the downstream unit 18 corresponding to the semiconductor switch 60 is received (S80).

When the downstream OFF command for the downstream unit 18 corresponding to the semiconductor switch 60 is received (YES in S80), the zone control unit 80 brings the semiconductor switch 60 into the OFF state (S81) and ends the present switch control processing (S50).

When the downstream OFF command for the downstream unit 18 corresponding to the semiconductor switch 60 is not received (NO in S80), the zone control unit 80 determines whether a downstream ON command for the downstream unit 18 corresponding to the semiconductor switch 60 is received (S82).

When the downstream ON command for the downstream unit 18 corresponding to the semiconductor switch 60 is received (YES in S82), the zone control unit 80 brings the semiconductor switch 60 into the ON state (S83) and ends the present switch control processing (S50).

When the downstream ON command for the downstream unit 18 corresponding to the semiconductor switch 60 is not received (NO in S82), the zone control unit 80 ends the present switch control processing (S50). In this case, the current state of the semiconductor switch 60 is maintained.

When the downstream OFF command or the downstream ON command is received in a state where the fuse function of the semiconductor switch 60 is activated, the downstream OFF command or the downstream ON command is not effectively processed, and the semiconductor switch 60 is maintained in the OFF state as illustrated in step S61.

As described above, the downstream unit 18 of the power system 1 of the present embodiment is woken up when the semiconductor switch 60 of the zone unit 16 is brought into the ON state.

Accordingly, in the power system 1 of the present embodiment, the power supply driver capable of waking up the downstream unit 18 according to communication can be omitted in the downstream unit 18, and the cost can be reduced by the amount corresponding to the power supply driver omitted.

In the power system 1 of the present embodiment, the electric wire characteristic data 50 stored in the central storage device 42 is transmitted to the zone unit 16 and written in the zone storage device 72. Accordingly, in the power system 1 of the present embodiment, even if a condition for controlling the semiconductor switch 60 is different in a plurality of zone units 16, the electric wire characteristic data 50 related to the conditions for controlling the semiconductor switches 60 can be collectively managed in the central storage device 42.

Accordingly, in the power system 1 of the present embodiment, a plurality of electronic control units, for example, a plurality of zone units 16 can have a common configuration. As a result, in the present embodiment, it is possible to facilitate development and management of the power system 1.

Although the embodiments of the present disclosure have been described above with reference to the accompanying drawings, it goes without saying that the present disclosure is not limited to the embodiments. It is apparent to those skilled in the art that various modifications and alterations can be conceived within the scope of the claims, and it is understood that the modifications and alterations naturally fall within the technical scope of the present disclosure.

What is claimed is:

1. A power system comprising:
   a central unit;
   a zone unit capable of communicating with the central unit; and
   a downstream electric wire configured to electrically connect a predetermined downstream unit to the zone unit,
   wherein the zone unit comprises
      one or more zone processors,
      one or more zone memories coupled to the one or more zone processors,
      a zone storage device that is electrically writable nonvolatile,
      a semiconductor switch capable of electrically connecting the downstream electric wire, which is coupled to the downstream unit, to a power supply, and
      a current sensor configured to detect a current flowing to the downstream electric wire through the semiconductor switch,
   wherein the central unit comprises
      one or more central processors,
      one or more central memories coupled to the one or more central processors, and
      a central storage device in which electric wire characteristic data indicating a characteristic of the downstream electric wire is stored in advance,
   wherein the one or more central processors execute processing including transmitting the electric wire characteristic data stored in the central storage device to the zone unit at a predetermined timing, and
   wherein the zone processor executes processing including
      writing the electric wire characteristic data transmitted from the central unit into the zone storage device in response to reception of the electric wire characteristic data transmitted from the central unit, and
      calculating a temperature estimation value that is an estimation value of a temperature of the downstream electric wire, based on the electric wire characteristic data written into the zone storage device and the current detected by the current sensor,
      turning the semiconductor switch to an OFF state when the temperature estimation value exceeds a predetermined temperature threshold, and
      turning the semiconductor switch to the OFF state, even when the temperature estimation value is equal to or lower than the predetermined temperature threshold, if a downstream OFF command, which is a command for interrupting the electric power to the downstream unit corresponding to the semiconductor switch, is received from the central unit.

2. The power system according to claim 1, wherein the central processor executes processing including acquiring the electric wire characteristic data written into the zone storage device by performing communication with the zone unit when a specific condition is satisfied, determining whether the electric wire characteristic data acquired from the zone unit coincides with the electric wire characteristic data stored in the central storage device, and making a notification about a writing error of the electric wire characteristic data when the electric wire characteristic data acquired from the zone unit does not coincide with the electric wire characteristic data stored in the central storage device.

* * * * *